/ Patented Mar. 20, 1951

2,545,497

UNITED STATES PATENT OFFICE 2,545,497

HALOMETHYL DERIVATIVES OF DYES OF THE THIOINDIGO SERIES AND PROCESS OF OBTAINING THEM

Carl M. Smith and David I. Randall, Easton, Pa., assignors to General Aniline & Film Corporation, New York, N. Y., a corporation of Delaware No Drawing. Application December 28, 1949, Serial No. 135,518

6 Claims. (Cl. 260—332)

This invention relates to the production of halogen methyl derivatives of thioindigos.

Thioindigos have long been known as valuable vat dyes. They are insoluble in aqueous and spirit solutions and cannot, therefore, be applied substantively to fabrics. They derive their dyeing properties from their capacity of passing into solution as "leuco" compounds when reduced with alkaline agents. This treatment with reducing agents converts the insoluble dye to a phenolic form by reduction of one or more of the keto groups. Applied to thioindigo, for example, the conversion is as follows:

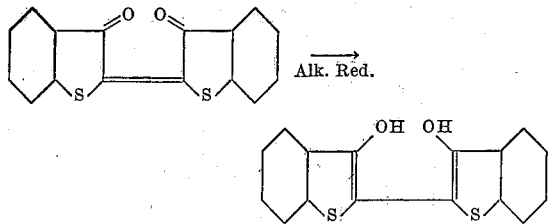

Alkaline solutions of the reduced compounds possess a considerable affinity for cotton fibre and have the property of being readily reoxidized on treatment by air with the precipitation of the original dyestuff.

Although this method produces a fast bond between the dye and the fibre due to the thorough impregnation of the fibre with the "leuco" or reduced form of the dye and precipitation of the dye on the fibre during oxidation, it is obviously subject to limitations. Fabrics which are affected by alkali cannot be dyed by this method. Thus in wool dyeing it would be necessary to neutralize the "leuco" or reduction solution. Some methods for effecting that result have been proposed but have not been successfully employed. A more successful approach has been the use of leuco-esters of the thioindigo dyes. Other problems are also inherent in the process of dyeing from leuco vats. Carefully controlled coditions and special equipment are necessary. Boosters, such as glycols, must be added to maintain proper alkalinity.

It is, therefore, an object of this invention to produce thioindigos in a form which can be used directly as a dye or a dye intermediate.

It is a further object of this invention to produce thioindigos which do not require alkaline solutions for dyeing.

With these and other objects in mind, it has now been discovered that thioindigo and some of its derivatives may be converted to valuable dyes and dye intermediates by producing the halomethyl, particularly the chlormethyl derivative of the thioindigo compound. Thioindigos which have been found suitable for such conversion are those having the formulae:

(1) 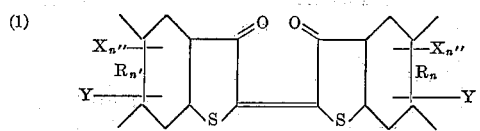

and (2) 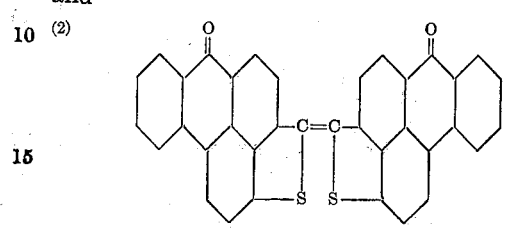

wherein R is a fused 6-membered ring system; $n$ and $n'$ are the same or different integers from 0 to 2; X and Y are the same or different members of the group consisting of H, alkyl, and halogen; and $n''$ is an integer from 1 to 2.

The chlormethyl derivatives are produced by dissolving the thioindigo compound in a solvent for the reactants, specifically 96% sulfuric acid, introducing dichlordimethylether at room temperature and stirring the reaction mixture at temperatures of from 30° to 80° C. for several hours. The activity of the chlormethylation reaction and, hence, the reaction time and the entering position or positions of the chlormethyl groups depends somewhat upon the blocking and directing influence of substituent groups. Thus, in the case of unsubstituted thioindigo the chlormethylation will be symmetrical with two entering chlormethyl groups as follows:

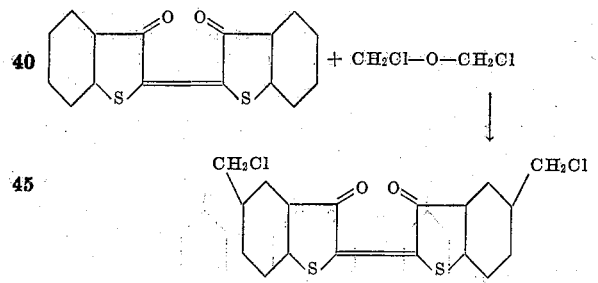

The same symmetrical di-substitution takes place upon chlormethylating a symmetrically substituted dialkyl-dihalo thioindigo where the 5 position is unsubstituted. When the 5 position is blocked as in symmetrical tetra-alkyl thioindigo, the entering positions for chlormethylation are the symmetrical 7,7' positions. Where the thioindigo is unsymmetrical, containing a different number of fused hydrocarbon ring systems on either side of the >C=C< bridge, the substitution will follow the pattern of the following reaction:

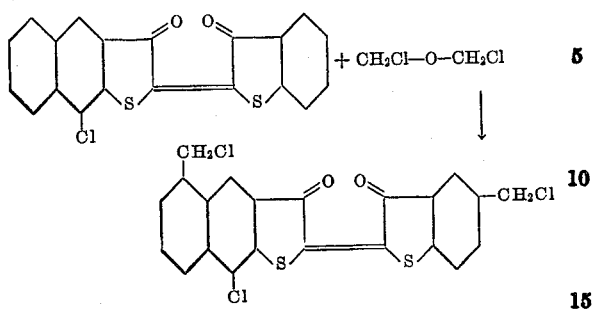

In unsymmetrically ring substituted types only one chlormethyl group may be introduced as in the following reaction:

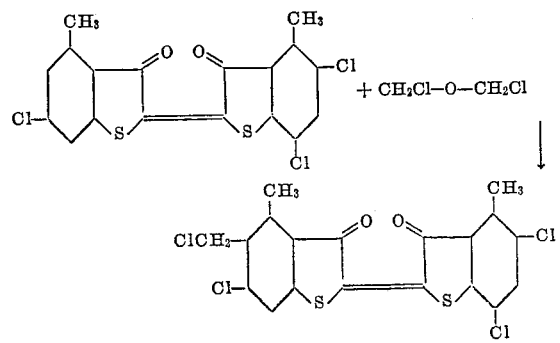

Generally speaking the positions taken by the entering chlormethyl groups follow the rules of normal substitution. Thus, as illustrated above, unsubstituted and symmetrically substituted thioindigo will chlormethylate in the 5 position (para to the sulfur atom), provided that no meta directing group is present in the benzenoid ring and provided the 5 position is not blocked. When more than one fused benzenoid ring is present, chlormethylation will take place more readily than in the case of mono benzenoid ring compounds, as for example thioindigo itself.

Some of the chlormethylated thioindigos produced in accordance with this invention may be vatted and used as dyes. However, all may be used as intermediates and by far their greatest utility may be realized by further condensation with amines and mercaptans to produce spirit and water-soluble dyes.

The invention will be further described with respect to the following examples, which are intended to illustrate it but not limit its scope. Unless otherwise stated, the parts are by weight.

*Example 1*

Chloromethylation of the thioindigo dye having the formula:

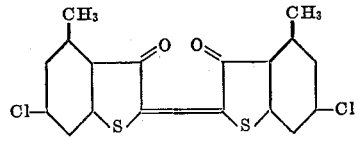

In a 2-liter, 3-necked flask fitted with thermometer, agitator, and drying tube was charged 750 cc. 96% sulfuric acid and 40 g. of the thioindigo dye of the above formula. When the dyestuff was evenly dispersed in the sulfuric acid, 25 cc. dichlorodimethyl ether was charged and the mixture stirred at room temperature (25-30° C.) (18 hours). HCl was slowly evolved. The mixture was then heated to 40° C. HCl was vigorously evolved. Held 1 hour at 40° C. and drowned in ice. The mixture was filtered and the precipitate was washed neutral to litmus with cold water.

The product was obtained in a yield of 45.5 g. calculated as 100% dry or 91.5% of theoretical. It has the formula:

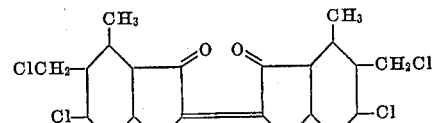

*Example 2*

Chloromethylation of the thioindigo dye having the formula:

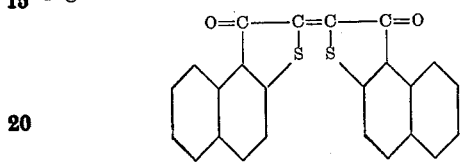

In a 2-liter, 3-necked flask fitted with thermometer, agitator, and drying tube was charged 750 cc. 96% sulfuric acid and 35.5 g. of the thioindigo dye of the above formula. When the dyestuff was thoroughly dispersed in the acid, 25 cc. dichlorodimethyl ether was added dropwise and the mixture stirred 18 hr. at room temperature (25-30° C.). The reaction mix was poured into ice, filtered, washed neutral to litmus with cold water and dried.

The product was obtained in a yield of 45.0 g. It has the formula:

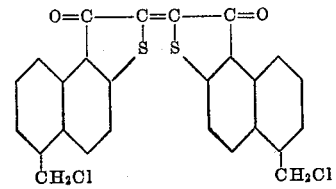

*Example 3*

Chloromethylation of thioindigo:

A solution of 14.8 g. thioindigo in 120 cc. 96% sulfuric acid was prepared at 25° C. To the solution was added at 12.9 cc. bischloromethyl ether. The temperature was raised to 60° C. and held for 8 hours. After working up as in Example 1, 21.0 g. of a red dichloromethyl thioindigo were obtained containing 2-chloromethyl groups per molecule. The product has the formula:

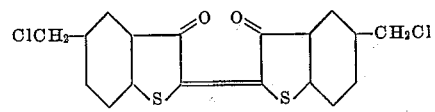

This product did not give a soluble vat and therefore cannot be used as a vat dye. It easily reacted with various amines and thioureas to yield useful colored compounds.

*Example 4*

Chloromethylation of the thioindigo dye having the formula:

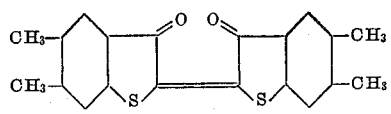

A solution of the thioindigo shown above was dissolved in 200 cc. 96% sulfuric acid and to it was added 20 cc. bischloromethyl ether. For 16 hrs. the temperature was held at 25° C. and then worked up as in Example 1. The yield amounted to 21.5 grams and analyzed 14.5% chlorine (theory for 2 chlorines 15.6%). Violet dyeings of good fastness properties were obtained which were noticeably bluer than those given by the starting material.

In this case the 5,5' position or positions para to the S atom were blocked, as were also the meta positions. Accordingly the chlormethyl groups enter the 7,7' position ortho to the S atom, providing a product of the following formula:

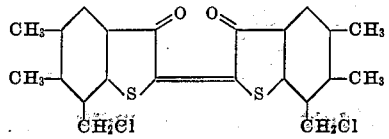

*Example 5*

Chloromethylation of the thioindigo having the formula:

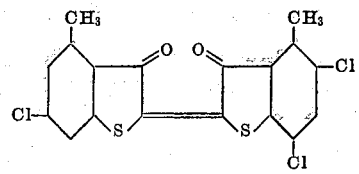

This dyestuff chloromethylates with somewhat greater difficulty than the dimethyldichlorothiourea of Example 1. By using the same experimental procedure and weights as in Example 1 and a temperature of 65-70° C. rather than 60° C., one chloromethyl group may be introduced. The new dye is considerably bluer than the original dyestuff. The yield is quantitative. It has the formula:

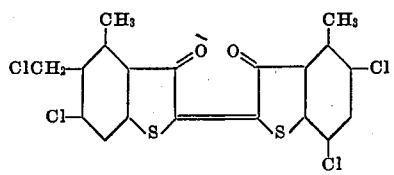

*Example 6*

By following the same procedure and using the same quantities as in Example 1, the following chlormethylation may be effected:

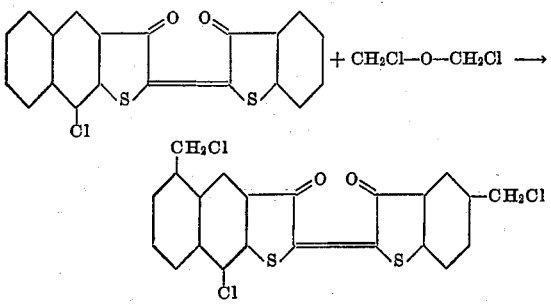

The yield is quantitative and the chlormethylated dye product is somewhat bluer than the starting material.

*Example 7*

Chlormethylation of the thioindigo having the formula:

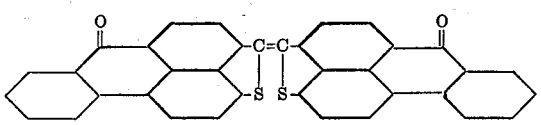

A solution of 10.0 g. of the thioindigo of the above formula was prepared in 90 cc. of 96% sulfuric acid at 25° C. To this solution 10 cc. of bischloromethyl ether was added. The resulting solution was heated to 60-65° C. for 15 hours. The chlormethylated product which contains two chlormethyl groups was worked up in the same manner as the product of Example 1.

*Example 8*

Chlormethylation of the thioindigo identified as: 9 - chloro - 2 - [5 - bromo-3-oxo-2(3)indolylidene]naphtho[1,2-b]thiophen-3-one.

In a 3-necked, 500 cc. flask fitted with thermometer, agitator, and directing tube, was charged 400 cc. 96% sulfuric acid, 22 g. of the thioindigo of the above formula purified, and 13 cc. dichlorodimethyl ether. The mixture was stirred 34 hours at room temperature, drowned on ice, filtered, washed neutral, and dried. Yield 25.5 g.

|  | Per Cent Total Halogen | Per Cent Halogen Found |
|---|---|---|
| Anal.: |  |  |
| For (unreacted) starting product | 16.0 | |
| For 1 —CH₂Cl group introduced | 21.7 | 22.7 |
| For 2 —CH₂Cl groups introduced | 27.5 | |

On vatting this product, dark blue color was completely destroyed. It produced a water-soluble product with trimethylthiourea, and with dimethylthiourea. It has the structural formula:

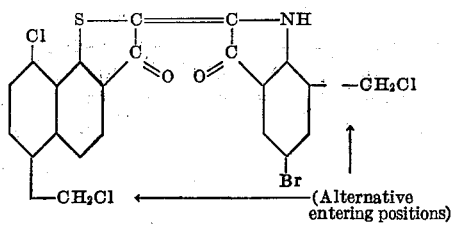

*Example 9*

Chlormethylation of the thioindigo having the formula:

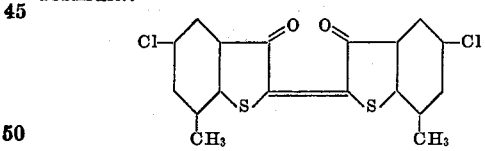

In a 500 cc., 3-necked flask fitted with thermometer, agitator, and drying tube, was charged 300 cc. monohydrate, 20 g. of the thioindigo of the above formula, 15 cc. dichlorodimethyl ether. The mixture was heated at 50° C. for 16 hours. It was then drowned in ice, filtered, washed neutral.

Yield = 40.5 g. paste
= 23.4 g. dry 100%

This paste on treatment with dimethylthiourea reacted to give about 50% of water-soluble material.

|  | Per Cent Cl Calcd. | Per Cent Cl Found |
|---|---|---|
| Anal.: |  |  |
| For 1 —CH₂Cl group introduced | 24.2 | 26.03 |
| For 2 —CH₂Cl groups introduced | 29.0 | |

A mixture of mono- and dichlormethylated products is obtained, chlormethylation taking place in the 6 positions.

We claim:
1. The halomethyl thioindigo compounds of the class consisting of those having the formulae:

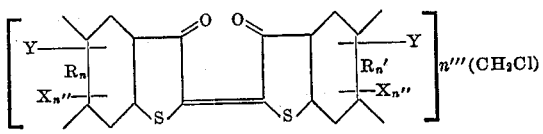

and

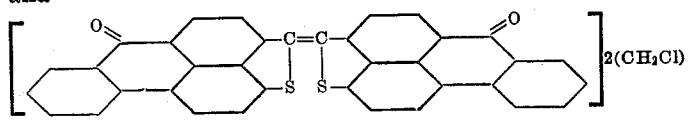

wherein R represents a fused six-membered hydrocarbon ring; $n$ and $n'$ are the same or different integers from 0 to 2; $n''$ and $n'''$ are integers from 1 to 2; X and Y are members of the group consisting of hydrogen, and halogen atoms and alkyl radicals.

2. 5,5'-dichlormethyl thioindigo having the formula:

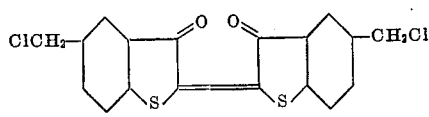

3. The 5,5'-dichlormethyl - 4,4' - dichloro-6,6'-dimethyl thioindigo having the formula:

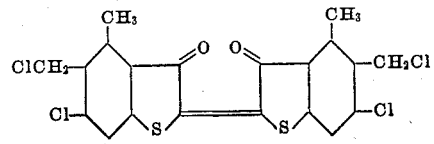

4. The dichlormethylated thioindigo having the formula:

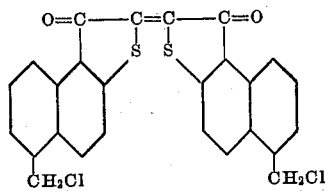

5. The dichlormethyl-tetramethyl thioindigo of the formula:

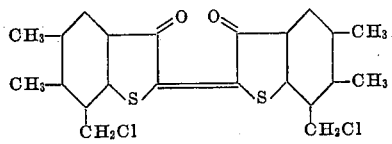

6. The monochlormethylated thioindigo having the formula:

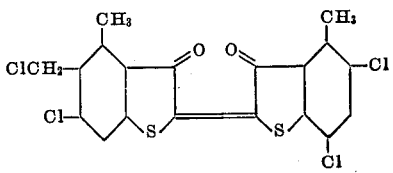

CARL M. SMITH.
DAVID I. RANDALL.

No references cited.